United States Patent
Kardos et al.

(10) Patent No.: US 11,215,101 B2
(45) Date of Patent: Jan. 4, 2022

(54) ARRANGEMENT COMPRISING A WHR SYSTEM AND A METHOD FOR CONTROLLING SUCH AN ARRANGEMENT

(71) Applicant: Scania CV AB, Södertälje (SE)

(72) Inventors: Zoltan Kardos, Södertälje (SE); Ola Hall, Stockholm (SE); Thomas Sederholm, Jordbro (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 15/734,260

(22) PCT Filed: Jun. 17, 2019

(86) PCT No.: PCT/SE2019/050570
§ 371 (c)(1),
(2) Date: Dec. 2, 2020

(87) PCT Pub. No.: WO2019/245435
PCT Pub. Date: Dec. 26, 2019

(65) Prior Publication Data
US 2021/0215082 A1   Jul. 15, 2021

(30) Foreign Application Priority Data
Jun. 20, 2018 (SE) .................................. 1850751-7

(51) Int. Cl.
*F01N 5/02* (2006.01)
*F01K 9/00* (2006.01)
(Continued)

(52) U.S. Cl.
CPC ............... *F01N 5/02* (2013.01); *F01K 9/003* (2013.01); *F01K 13/02* (2013.01); *F01K 23/065* (2013.01);
(Continued)

(58) Field of Classification Search
CPC .... F01N 5/02; F01N 2240/22; F01N 2240/02; F01K 23/14; F01K 9/003; F01K 13/02;
(Continued)

(56) References Cited

U.S. PATENT DOCUMENTS 3,242,345 A  *  3/1966  Kimura ................ H02K 7/1823
                                                      290/2
4,164,848 A     8/1979  Gilli et al.
(Continued)

FOREIGN PATENT DOCUMENTS

| JP | 2000303803 A | 10/2000 |
| WO | 2012096958 A1 | 7/2012 |
| WO | 2016039439 A1 | 3/2016 |

OTHER PUBLICATIONS

Scania CV AB, International Application No. PCT/SE2019/050570, International Search Report, dated Sep. 16, 2019.
(Continued)

*Primary Examiner* — Hoang M Nguyen
(74) *Attorney, Agent, or Firm* — Moore & Van Allen PLLC; W. Kevin Ransom

(57) ABSTRACT

The present invention relates to an arrangement comprising a waste heat recovery system (WHR-system) and a method for controlling the arrangement. The arrangement comprises an expansion tank having a constant inner volume, first cooling means configured to cool the working fluid in the condenser and a control unit configured to control the first cooling means such that the working fluid is cooled to a desired condensation temperature in the condenser during operation of the WHR system. The arrangement comprises further a sub-cooler arranged in a position downstream of the condenser and second cooling means configured to cool the working fluid in the sub-cooler, and that the control unit is configured to control the second cooling means such that the working fluid receives a determined subcooling in the sub-cooler during operation of the WHR system.

15 Claims, 5 Drawing Sheets

(51) Int. Cl.
*F01K 13/02* (2006.01)
*F01K 23/06* (2006.01)
*F01K 23/10* (2006.01)
*F01K 23/14* (2006.01)
*F02G 5/02* (2006.01)
*F01K 15/02* (2006.01)

(52) U.S. Cl.
CPC ............ *F01K 23/101* (2013.01); *F01K 23/14* (2013.01); *F02G 5/02* (2013.01); *F01K 15/02* (2013.01); *F01N 2240/02* (2013.01); *F01N 2240/22* (2013.01)

(58) Field of Classification Search
CPC ...... F01K 23/065; F01K 23/101; F01K 15/02; F02G 5/02
USPC ..................................................... 60/618, 670
See application file for complete search history.

(56) References Cited

U.S. PATENT DOCUMENTS

| | | | | |
|---|---|---|---|---|
| 4,248,049 A | * | 2/1981 | Briley | F24D 11/0221 62/235.1 |
| 4,918,937 A | * | 4/1990 | Fineblum | F25B 1/00 62/175 |
| 6,490,872 B1 | * | 12/2002 | Beck | A23G 9/045 62/303 |
| 2005/0198961 A1 | * | 9/2005 | Shirk | F03G 6/005 60/670 |
| 2005/0253107 A1 | * | 11/2005 | Flynn | C09K 5/041 252/67 |
| 2011/0167818 A1 | | 7/2011 | Tsuchino et al. | |
| 2013/0263594 A1 | | 10/2013 | Hall | |
| 2014/0013743 A1 | | 1/2014 | Dane | |
| 2014/0318124 A1 | | 10/2014 | Ernst et al. | |
| 2015/0013338 A1 | | 1/2015 | Smague et al. | |
| 2015/0027118 A1 | | 1/2015 | Tricaud et al. | |
| 2018/0020573 A1 | * | 1/2018 | Bouras | H05K 7/20309 |

OTHER PUBLICATIONS

Scania CV AB, International Application No. PCT/SE2019/050570, Written Opinion, dated Sep. 16, 2019.
Scania CV AB, Swedish Application No. 1850751-7, Office Action, dated Jan. 17, 2019.
Scania CV AB, International Application No. PCT/SE2019/050570, International Preliminary Report on Patentability, dated Dec. 22, 2020.

* cited by examiner

ARRANGEMENT COMPRISING A WHR SYSTEM AND A METHOD FOR CONTROLLING SUCH AN ARRANGEMENT

CROSS-REFERENCE TO RELATED APPLICATIONS

This application is a National Stage Application (filed under 35 § U.S.C. 371) of PCT/SE2019/050570, filed Jun. 17, 2019 of the same title, which, in turn claims priority to Swedish Application No. 1850751-7 filed Jun. 20, 2018 of the same title; the contents of each of which are hereby incorporated by reference.

BACKGROUND OF THE INVENTION

The present invention relates to an arrangement comprising a WHR system and a method for controlling such a WHR system.

A WHR system (Waste Heat Recovery System) can be used in vehicles for recovering waste thermal energy and convert it to mechanical energy or electric energy. A WHR system includes pump, which pressurizes and circulates a working fluid in a closed circuit. The circuit comprises one or several evaporators where the working fluid is heated and evaporated by one or several heat sources such as, for example, the exhaust gases from a combustion engine. The pressurized and heated gaseous working fluid expands in an expander. The expander generates mechanical energy, which can be used to operate the vehicle or apparatuses on the vehicle. Alternatively, the expander is connected to a generator generating electric energy. The working fluid leaving the expander is directed to a condenser. The working fluid is cooled down in the condenser to a temperature at which it condenses.

In order to achieve a high thermal efficiency in a WHR-system, the working fluid is to be cooled to a condensation temperature as low as possible and substantially without subcooling in the condenser. However, a certain subcooling is necessary in order to guarantee that no gaseous working fluid is directed to the working fluid pump. It is known to use an expansion tank in WHR system with an adjustable inner volume for volume compensation and pressure control of the working fluid in a WHR system. Such an expansion tank may comprise an outer rigid tank and an inner rubber bladder receiving liquid working fluid. The volume of the rubber bladder and thus the volume of the working fluid in the WHR system is changed by applying a varied compressed air pressure on the outside of the rubber bladder. However, it is very difficult to obtain a fast response and an accurate control of the pressure in the WHR system due to the flexible properties of the rubber bladder. Thus, it is difficult to provide an accurate control of the condensation temperature and the subcooling of the working fluid in the WHR system, which is a necessary for providing an efficient operation of the WHR system. Furthermore, the frequent volume fluctuations of the working fluid may damage the rubber bladder and reduce the lifetime of the expansion tank.

SUMMARY OF THE INVENTION

The object of the present invention is to provide an arrangement comprising a WHR system which is able to provide a robust and reliable control of the condensation temperature and the subcooling of the working fluid, to use a simple expansion tank with a constant inner volume and to prevent inleakage of ambient air when the WHR system is not in operation.

The above mentioned objects are achieved by the cooling system according to the claims. The arrangement comprises a sub-cooler arranged in a position downstream of the condenser. First cooling means are used to cool the working fluid to a desired condensation temperature in the condenser and second cooling means are used to cool the working fluid in the sub-cooler. Such an individual cooling of the coolant in the condenser and in the sub-cooler makes it possible to provide a very reliable control of the condensation temperature as well as the subcooling of the working fluid. An arrangement with such a cooling of the working fluid does not need an expansion tank with an adjustable inner volume for pressure control of the working fluid. In this case, it possible to use a simple expansion tank having a constant inner volume for volume compensation. The first cooling means may comprise a liquid cooling medium such as a coolant or a gaseous cooling medium such as ambient air for cooling the working fluid to a desired condensation temperature in the condenser. The second cooling means may also comprise a liquid cooling medium such as a coolant or a gaseous cooling medium such as ambient air for subcooling of the working fluid in the sub-cooler.

According to an embodiment of the invention, the first cooling means comprises a condenser inlet line and a condenser valve configured to direct coolant from a cooling system to the condenser, and that the control unit is configured to control the coolant valve such that coolant at a temperature and flow is directed, via the condenser inlet line, to the condenser at which the working fluid is cooled to the desired condensation temperature. The working fluid may be cooled in the condenser by coolant from a cooling system cooling an engine in a vehicle. The condenser valve may be a three way valve directing a mixture of coolant from a radiator and a radiator bypass line to the condenser It is of course possible to use other kinds of valves for this purpose.

According to an embodiment of the invention, the second cooling means comprises a sub-cooler inlet line and a sub-cooler valve configured to direct coolant from a cooling system to the sub-cooler and that the control unit is configured to control the sub-cooler valve such that coolant at a temperature and flow is directed, via the sub-cooler inlet line, to the sub-cooler at which the working fluid receives the determined subcooling. The working fluid may be cooled in the sub-cooler by coolant from a cooling system cooling an engine in a vehicle. The sub-cooler inlet line may receive coolant from a suitable position in the cooling system where the coolant has a suitable temperature. The second cooling means may comprise a sub-cooler valve configured to direct a part of the coolant flow in the condenser inlet line, via the sub-cooler inlet line, to the sub-cooler. In this case, coolant of the same temperature is directed to the condenser and the sub-cooler. By means of the sub-cooler valve, it is possible to control the flow of the coolant such that the working fluid receives the determined subcooling in the sub-cooler. The sub-cooler inlet line may comprise a cooler. In this case, it is possible to cool the coolant in the sub-cooler inlet line to a lower temperature than the coolant in the condenser inlet line.

According to an embodiment of the invention, the expansion tank is connected to a flow passage between the condenser and the sub-cooler. Such a positioning of the expansion tank makes it possible to receive liquid working fluid from the condenser when the temperature and volume of the circulating working fluids increases and to supply liquid working fluid to the sub-cooler when the temperature and the volume of the circulating working fluids decreases.

According to an embodiment of the invention, the expansion tank is connected to said flow passage via a single line. In this case, the working fluid flows, via the single line, in a direction towards the expansion tank when the temperature and the volume of the working fluid increases and in an opposite direction when the temperature and the volume of the working fluid decreases. Alternatively, the expansion tank is connected to said flow passage via a tank inlet line and a tank outlet line. In this case, a control valve may be arranged in the flow passage between the tank inlet line and the tank outlet line. When said control valve is closed, the entire working fluid flow from the condenser flows, via the tank inlet line, to the expansion tank before it is returned, via the tank outlet line, to the flow passage and the sub-cooler. According to a further embodiment of the invention, flow passage extends through the expansion tank. In this case, the entire working fluid always flow from the condenser via the expansion tank to the sub-cooler.

During regular operation of a WHR system, the working fluid is partly in gaseous state. When the working fluid pump stops, the working fluid is cooled down to ambient air temperature. The gaseous part of the working fluid is condensed during this cooling process which results in a pressure drop in the WHR system. In view of this fact, negative pressures in relation to ambient pressure may be created in the WHR system when the working fluid has been cooled to ambient temperature. In such a case, there is a risk for inleakage of ambient air into the WHR system and especially in parts adjacent to the expander which are difficult to seal.

In order to avoid penetration of ambient air into the WHR system, the arrangement may comprise flow restricting means, which, during a shutdown phase of the WHR system, is configured restrict the working fluid flow in the WHR system such that a low pressure area is created in the WHR system including the expansion tank and a high pressure area is created in the WHR system including at least the evaporator, the expander and the condenser and wherein the control unit is configured to run the working fluid pump until all working fluid in the high pressure area is in liquid state. The control unit may, during the shutdown process, receive information from sensors about the pressure and the temperature of the working fluid in the warmest point of the high pressure area. When the control unit receives information indicating that the working fluid has a pressure above the condensation pressure at the prevailing temperature, all working fluid in the high pressure area is in liquid state and the control unit stops the working fluid pump.

Consequently, there is no risk for condensation of the working fluid in the high pressure area during a following cooling of the working fluid to ambient air temperature since all working fluid already is in liquid state. Thus, the above mentioned risk with negative pressures and inleakage of ambient air in the high pressure area is eliminated. However, the expansion tank, which is comprised in the low pressure area, will contain gaseous working fluid during the shutdown phase of the WHR system which condenses during the cooling process to ambient temperature. However, it is relatively easy to provide a completely air tight expansion tank. In view of this fact, it is usually no problem to accommodate working fluid with negative pressures in the expansion tank.

According to an alternative embodiment the arrangement comprises a heater arranged in the expansion tank and tank flow restricting means and that the control unit is, during a shutdown phase of the WHR system, configured to control the heater such that it establishes a higher temperature of the working fluid in the expansion tank than the condensation temperature of the working fluid at ambient pressure, and to isolate the expansion tank by said tank flow restricting means from the remaining part of the WHR system when the temperature of the working fluid in all other parts of the WHR system is lower than the condensation temperature of the working fluid at ambient pressure. The temperature of the working fluid drops during the shutdown process. After a while, the working fluid in the expansion tank has the highest temperature in the WHR system due to the existence of the heater. This means that remaining gaseous working fluid will be collected in expansion tank. When the temperature of the working fluid outside the expansion tank drops below the condensation temperature for the working fluid at ambient pressure, all working fluid outside the expansion tank is in liquid state. The control unit controls the flow restricting means such that the expansion tank is isolated from the other parts of the WHR system. After that, the control unit deactivates the heater and stops the operation of the working fluid pump.

The initially mentioned objects are also achieved by the method defined in the claims.

BRIEF DESCRIPTION OF THE DRAWINGS

In the following preferred embodiments of the invention are described, as examples, with reference to the attached drawings, in which.

DETAILED DESCRIPTION OF THE INVENTION

Figure 1:
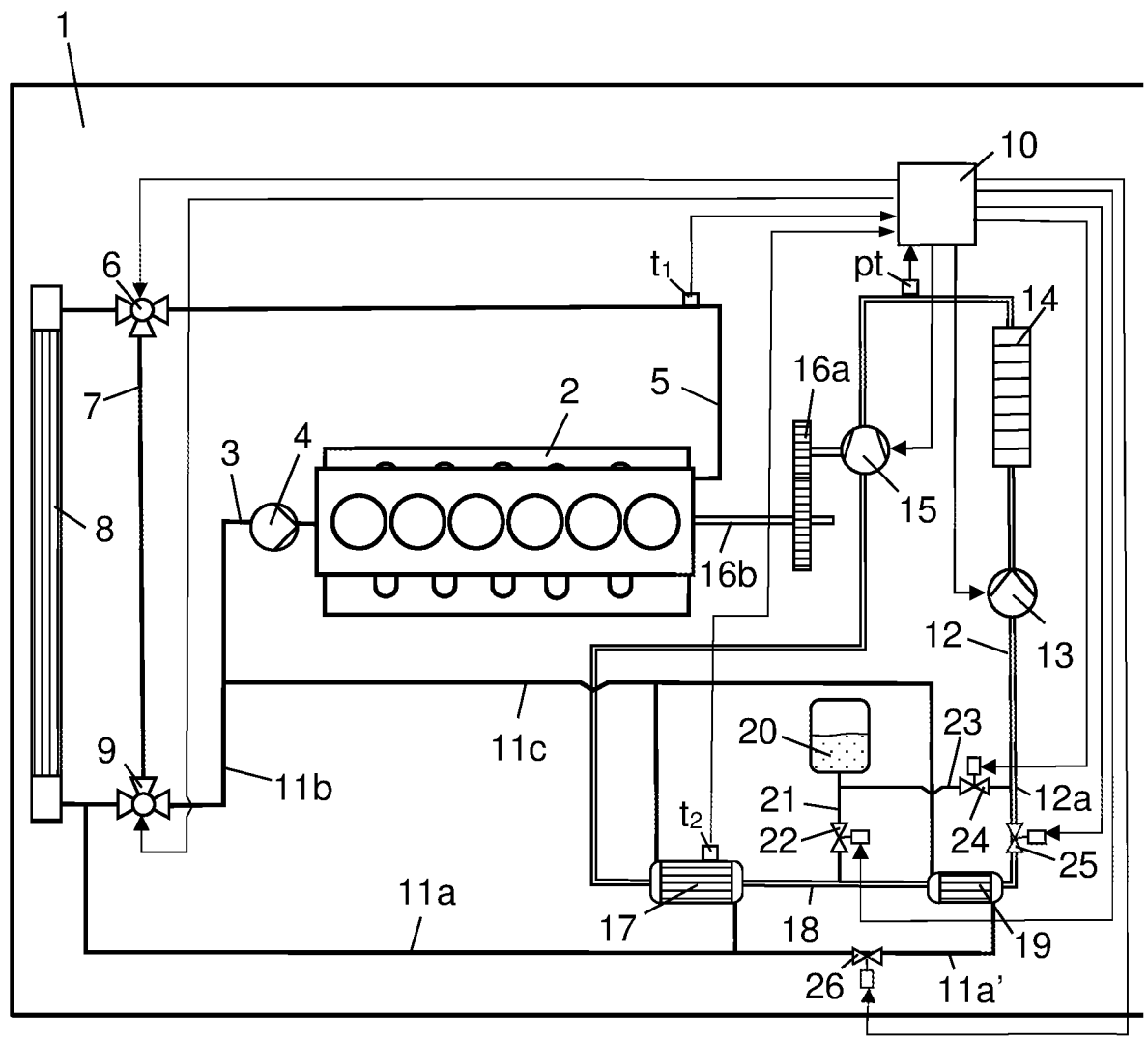
FIG. 1 shows an arrangement comprising a WHR system according to a first embodiment of the invention.

FIG. 1 shows a schematically disclosed vehicle 1 powered by a combustion engine 2. The vehicle 1 may be a heavy vehicle and the combustion engine 2 may be a diesel engine. The vehicle 1 comprises a cooling system comprising an engine inlet line 3 provided with a coolant pump 4 circulating a coolant in the cooling system. The coolant pump circulates coolant to the combustion engine 2. The coolant leaving the combustion engine 2 is received in an engine outlet line 5. A thermostat valve 6 is arranged at an end of the engine outlet line 5. In this case, the thermostat valve 6 is designed as a three way valve which is adjustable in a stepless manner. The thermostat valve 6 directs the coolant from the engine outlet line 5 to a radiator bypass line 7 or a radiator 8. The cooling system comprises a condenser valve 9 which in this case is designed as a three way valve adjustable in a stepless manner. The condenser valve 9 receives coolant flow from the radiator bypass line 7 and directs a part of it to a condenser inlet line 11a where the uncooled coolant is mixed with cooled coolant from the radiator 8. The condenser valve 9 directs a remaining part of the coolant flow from the radiator bypass line 7 to a condenser bypass line 11b. Alternatively, the condenser valve 9 receives a part of the coolant flow from the radiator 8 and direct it to the condenser bypass line 11b. In this case, a remaining part of the coolant flow from the radiator 8 is directed to condenser inlet line 11a. The thermostat valve 6 and the condenser valve 9 are controlled by a control unit 10.

The vehicle 1 is provided with a WHR-system (Waste Heat Recovery system). The WHR-system comprises a working fluid pump 13 receiving a working fluid via a pump inlet line 12. The working fluid pump 13 pressurizes and circulates the working fluid in the WHR system. In this case, the working fluid is ethanol. However, it is possible to use other kinds of working fluids such as for example R245fa. The working fluid pump 13 pressurizes and circulates the working fluid. The working fluid pump 13 directs the working fluid to an evaporator 14. The working fluid is heated in the evaporator 14, for example, by exhaust gases from the combustion engine 2. The working fluid is heated in the evaporator 14 to a temperature at which it evaporates. The gaseous working fluid is directed from the evaporator 14 to the expander 15. The pressurised working fluid expands in the expander 15. The expander 15 generates a rotary motion which may be transmitted, via a suitable mechanical transmission 16a, to a shaft 16b of the power train of the vehicle 1. Alternatively, the expander 15 may be connected to a generator transforming mechanical energy into electrical energy. The electrical energy may be stored in a battery. The stored electrical energy can be supplied to an electrical engine for driving of the vehicle 1 or a component on the vehicle 1 in a later state.

When the gaseous working fluid has passed through the expander 15, it is directed to a condenser 17. The working fluid is cooled in the condenser 17 by coolant from the cooling system to a temperature at which it condenses. The liquid working fluid is directed from the condenser 17, via a condenser outlet line 18, to a sub-cooler 19. An expansion tank 20 with a constant inner volume is connected, via a first connection line 21, to the condenser outlet line 18. The first connection line 21 comprises a first control valve 22. The working fluid leaving the sub-cooler 19 is returned, via the pump inlet line 12, to the working fluid pump 13. The expansion tank 20 is connected, via a second connection line 23, to a connection point 12a in the pump inlet line 12. The second connection line 23 comprises a second control valve 24. A third control valve 25 is arranged in the pump inlet line 12 in a position downstream of the sub-cooler 19 and upstream of second connection point 12a. The control unit 10 controls the control valves 22, 24, 25. The control unit 10 also controls the operation of the working fluid pump 13 and the expander 15 in the WHR system.

The condenser inlet line 11a directs coolant from the cooling system to the condenser 17 and the sub-cooler 19. A sub-cooler valve 26 controls the supply of coolant to the sub-cooler 19. The control unit 10 controls the sub-cooler valve 26 and thus the coolant flow directed to the sub-cooler 19. A condenser outlet line 11c receives coolant from the condenser 17 and the sub-cooler 19. The coolant in the condenser outlet line 11c is mixed with coolant from the condenser bypass line 11b. The mixture of said coolants is directed to the engine inlet line 3.

The temperature of exhaust gases from the combustion engine 2 and thus the heating of the working fluid in the evaporator 14 varies during different operating conditions. In order to maintain a substantially continuously high thermal efficiency in the WHR-system, the working fluid is to be cooled with an adjustable cooling effect in the condenser 17. It is favourable to establish a condensation pressure as low as possible at the different operating conditions. However, it is suitable to avoid negative pressure in the WHR-system by practical reasons. In view of these facts, it is suitable to provide a cooling of the working fluid in the condenser 17 to a condensation pressure just above 1 bar. Consequently, in order to maintain a high thermal efficiency it is necessary to adjust the cooling effect of the working fluid in the condenser 17 in view of the supplied heat energy from the exhaust gases such that the condensation pressure will be just above 1 bar. The working fluid ethanol has a condensation temperature of 78° C. at 1 bar. In this case, it is suitable to accomplish a condensation temperature of just above 78° C. in the condenser 17. Furthermore, it is necessary to provide a determined subcooling of the working fluid in the sub-cooler 19 in order to ensure that no gaseous working fluid reaches the working fluid pump 13.

During operation of the WHR system, the control unit 10 receives substantially continuously information about the coolant temperature from a first temperature sensor $t_1$ in the engine outlet line 5. The temperature of the coolant in the engine outlet line 5 indicates the cooling requirement of the coolant in the cooling system. In case the coolant has a low temperature the control unit 10 adjusts the thermostat valve 6 such that it directs a relatively large part of the coolant flow to the radiator bypass line 7 and a remaining relatively small part of the coolant flow to the radiator 8. On the other hand, in case the coolant has a high temperature, the control unit 10 adjusts the thermostat valve 6 such it directs a relatively small part of the coolant flow to the radiator bypass line 7 and a remaining relatively large part of the coolant flow to the radiator 8. Thus, the coolant flow rate to the radiator line 7 and the coolant flow rate to the radiator bypass line 9 can be varied by the thermostat valve 6. Consequently, it is possible to create two coolant flows of different temperatures and flow rates by means of the thermostat valve 6.

At least a part of the coolant flow which is cooled in the radiator 8 is directed to the condenser inlet line 11a. However, the coolant leaving the radiator 8 has usually a too low temperature for cooling the working fluid in the condenser 17 to the desired condensation temperature. In view of that fact, the control unit 10 may adjust the condenser valve 9 such that it directs a part of the warmer coolant flow from the radiator bypass line 7 to the condenser inlet line 11a. In this case, a mixture of a cold coolant from the radiator 8 and warm coolant from the radiator bypass line 7 is directed to the condenser 17. The condenser valve 9 directs the remaining part of the coolant from the radiator bypass line 7 to the condenser bypass line 11b.

The control unit 10 receives information about relevant operating parameters of the WHR system. The control unit 10 may, for example, receive information about the actual condensation temperature from a second temperature sensor $t_2$ in the condenser 17. During operation of the WHR system, the control unit 10 estimates a desired condensation temperature of the working fluid in the condenser 17. When ethanol is used as working fluid, a condensation temperature of about 80° C. is desirable during most operating conditions. The control unit 10 estimates a required flow and temperature of the coolant to be directed to the condenser 17 in order to provide the desired condensation temperature in the condenser 17. The control unit 10 controls the condenser valve 9 such coolant at the estimated flow and temperature is directed, via the condenser inlet line 11a, to the condenser 17.

Furthermore, the control unit 10 determines a required subcooling of the working fluid in the sub-cooler 19. The control unit 10 estimates the proportion of the coolant flow in the condenser inlet line 11a to be directed to the sub-cooler 19 in order to obtain the determined subcooling of the working fluid in the sub-cooler 19. The control unit 10 controls the sub-cooler valve 26 such that it directs the estimated proportion of the coolant flow in the condenser inlet line 11*a* to the sub-cooler 19. The sub-cooler valve 26 may be adjustable in a stepless manner. The coolant flow to the sub-cooler 19 is much smaller than the coolant flow to the condenser 17.

During regular operation of the WHR system, the control unit 10 sets the first control valve 22 in an open position such that volume changes of the working fluid in the WHR system is compensated by the expansion tank 20. The control unit 10 sets the second control valve 24 in a closed position and the third control valve 24 in an open position. The above mentioned control of the condensation temperature in the condenser 17 and the subcooling in the sub-cooler 19 is robust and reliable. Furthermore, it allows the use of a simple expansion tank 20 having a constant inner volume. Consequently, it is not necessary to use a conventional expansion tank in the WHR system in the form of an outer rigid tank and an inner rubber bladder with an adjustable inner volume for volume compensation and pressure control of the working fluid in the WHR system.

During a shutdown phase of the WHR system, the control unit 10 sets the first control valve 22 in a closed position such that the fluid connection between the expansion tank 20 and the condenser outlet line 18 closed. The control unit 10 sets the second control valve 24 in an open position such that a fluid connection is created between the expansion tank 20 and the working fluid pump 13 via the pump inlet line 12. The control unit sets the third control valve 25 in a closed position such that the fluid connection between the sub-cooler 19 and the pump inlet line 12 is closed. Furthermore, the control unit 10 sets the expander 15 in an idle state such the pressure drop over the expander 15 will be negligible and it controls the working fluid pump 13 such it continues to run.

The above mention control valves 22, 23, 24 restrict the working fluid flow during the shutdown phase of the WHR system. This means that the working fluid pump 13 sucks working fluid from the expansion tank 20 via the pump inlet line 12 such a low pressure area is created in a part of the WHR system including the expansion tank 20. At the same time, the working fluid pump 13 provides a pressurized working fluid flow to the evaporator 14, the expander 15, the condenser 17 and the sub-cooler 19. However, the working fluid flow from the working fluid pump 13 is blocked by the first control valve 22 and the third control valve 25. This means that a high pressure area is created in the WHR system including the evaporator 14, the expander 15, the condenser 17 and the sub-cooler 19. The pressure increases in the high pressure area as long as the working fluid pump 13 is in operation. The control unit 10 receives information from a sensor PT sensing the pressure and the temperature in the warmest point of the high pressure area of the WHR system. The warmest point is usually situated between the evaporator 14 and the expander 15. The working fluid pump 13 runs until the control unit 10 receives information from the pressure and temperature sensor PT indicating that the pressure has exceeded the condensation pressure at the prevailing working fluid temperature. This means that the all working liquid in the high pressure area is in liquid state. The control unit 10 closes the second control valve 24 such that the expansion tank 20 is isolated from the high pressure area of the WHR system. The control unit 10 stops the working fluid pump 13. This results in a liquid working fluid, via the working fluid pump 13 to the pump inlet line 12 such that all components in the WHR system contains liquid working fluid except the expansion tank 20.

During a following period when the WHR system is not in operation, ambient air cools down the working fluid in the WHR system. Negative pressures may be created in the WHR system when gaseous working fluid condensates. Since all working fluid in the high pressure area of the WHR system already is in liquid state there is no risk that negative pressures are arisen in this area of the WHR system when the temperature of the working fluid drops to ambient temperature. Thus, the risk for inleakage of ambient air into the high pressure area of the WHR system is eliminated. Especially areas in the vicinity of the expander 15 are difficult to seal from inleakage of ambient air. On the other hand, the working fluid in the expansion tank 20 is partly in gaseous state. This means that the gaseous working fluid condensates when it is cooled to ambient temperature. However, it is uncomplicated to provide a completely tight expansion tank 20. In view of that fact, there is usually no leakage problem with the expansion tank 20 despite the fact that negative pressures may be created in the expansion tank 20 when the WHR system is not in operation.

Figure 2:
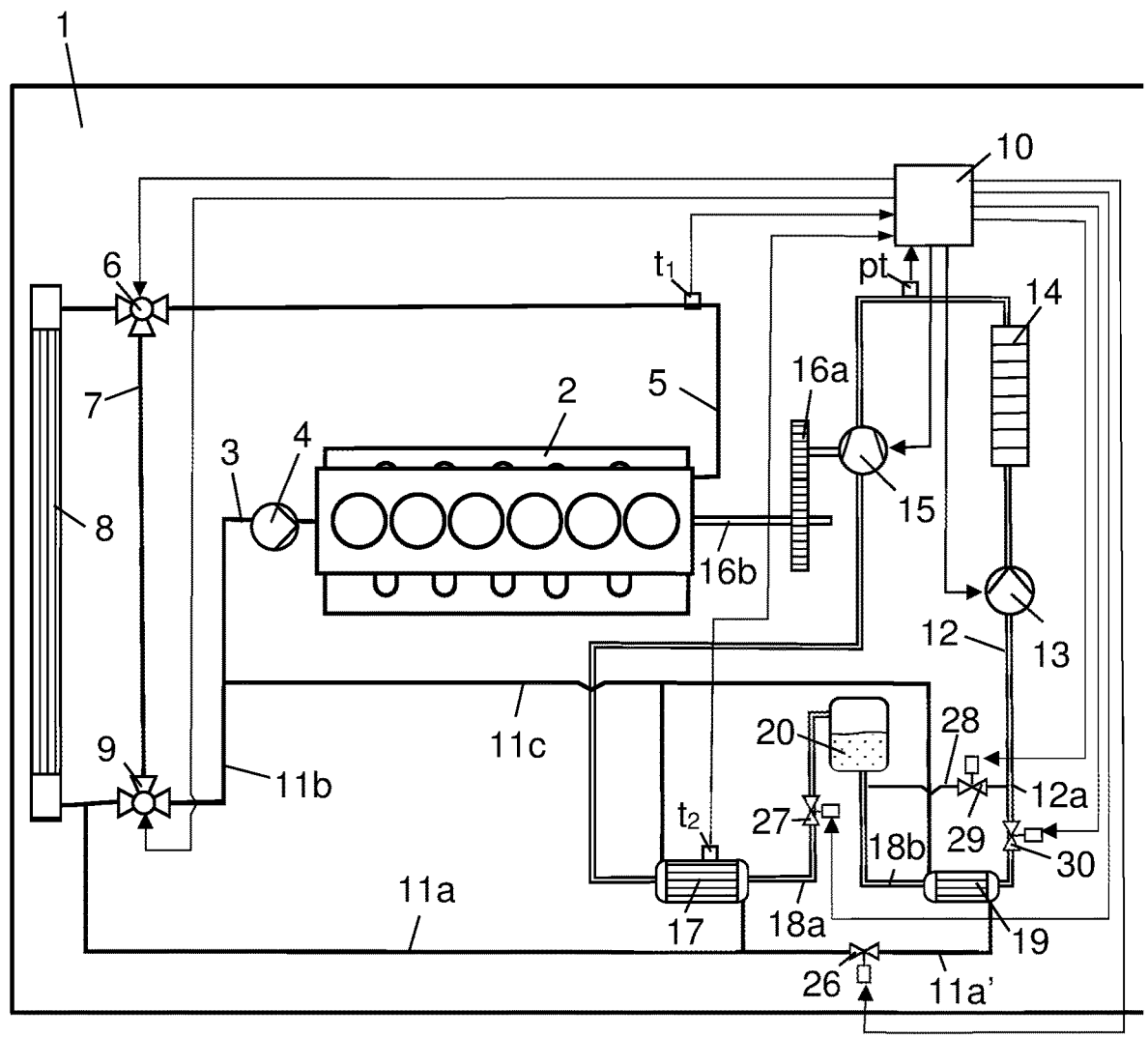
FIG. 2 shows an arrangement comprising a WHR system according to a second embodiment of the invention.

FIG. 2 shows an alternative embodiment of the arrangement. In this case, the working fluid flows through the expansion tank 20. The expansion tank 20 receives working fluid from the condenser 18 via a condenser outlet line 18*a* and it feeds out working fluid to the sub-cooler 19 via a sub-cooler inlet line 18*b*. The condenser outlet line 18*a* comprises a first control valve 27. A connection line 28 with a second control valve 29 connects the sub-cooler inlet line 18*b* to a connection point 12*a* in the pump inlet line 12. A third control valve 30 is arranged in the pump inlet line 12 in a position downstream of the sub-cooler 19 and upstream of the connection point 12*a*.

During a regular operation of the WHR system, the control unit 10 sets the first control valve 27 in an open position, the second control valve 29 in a closed position, and the third control valve 30 in an open position. This means that all working fluid leaving the condenser 17 is directed to the expansion tank 20. The working fluid flows from the expansion tank 20, via sub-cooler inlet line 18*b*, to the sub-cooler 19. The cooling of the working fluid in the condenser 17 and the subcooling of the working fluid in the sub-cooler 19 is performed in a corresponding manner as the embodiments shown in FIG. 1.

During a shutdown phase of the WHR system, the control unit 10 sets the first control valve 27 in a closed position such that the fluid connection between the condenser 17 and the expansion tank 20 is closed. The control unit 10 further sets the second control valve 29 in an open position such that a fluid connection is created between the expansion tank 20 and the working fluid pump 13 via the pump inlet line 12. Furthermore, the control unit 10 sets the third control valve 30 in a closed position such that the fluid connection between the sub-cooler 19 and the working fluid pump 13 is closed. Furthermore, the control unit 10 sets the expander 15 in an idle state and it controls the working fluid pump 13 such it continues to run. This means that the working fluid pump 13 sucks working fluid from the expansion tank 20 via the pump inlet line 12 such that a low pressure area is created in the WHR system including the expansion tank 20 and the sub-cooler 19. The working fluid pump 13 provides a pressurized working fluid flow to the evaporator 14, the expander 15 and the condenser 17. Since the first control valve 27 is closed, it blocks the working fluid flow. This results in the creation of a high pressure area in the WHR system which includes the evaporator 14, the expander 15 and the condenser 17.

The control unit 10 receives information from a pressure and temperature sensor pt about the pressure and the temperature in the warmest point of the WHR system. The working fluid pump 13 runs until the control unit 10 receives information from said sensor pt indicating that the working fluid pressure is higher than the condensation pressure at the existing working fluid temperature. This means that all working liquid in the high pressure area of the WHR system is in liquid state. The control unit 10 closes the second control valve 29 such that the expansion tank 20 and the sub-cooler 19 is isolated from the high pressure area of the WHR system. When the working fluid pump 13 stops, liquid working fluid fills up the working fluid pump 13 and the pump inlet line 12. Thus, all components in the WHR system contains liquid working fluid except the isolated expansion tank 20 and the sub-cooler 19 in the low pressure area of the WHR system.

During a following period when the WHR system is not in operation, the working fluid is cooled down by ambient air. Since the working fluid already is in liquid state in the high pressure area of the WHR system, no condensation of the working fluid is provided and no negative pressure are arisen in the high pressure area when the working fluid is cooled down to ambient air temperature. In view of the fact that there is no problem to provide a completely air tight sealing of the expansion tank 20 and the sub-cooler 19, there will be no inleakage of air into the WHR system via said components in spite of the fact that negative pressures are arisen in these components.

Figure 3:
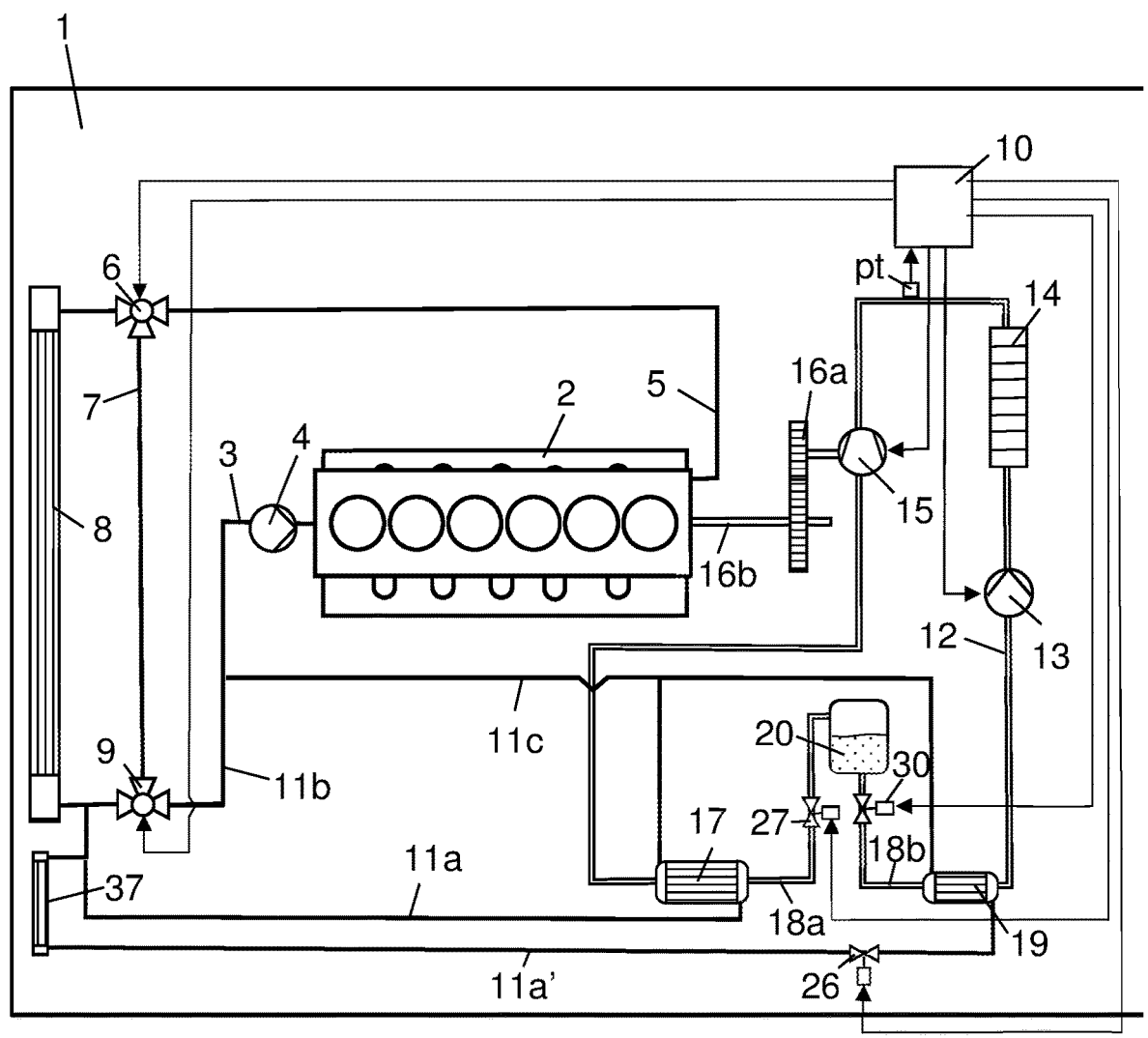
FIG. 3 shows an arrangement comprising a WHR system according to a third embodiment of the invention.

FIG. 3 shows a somewhat simpler embodiment than the embodiment shown in FIG. 2. In this case, the sub-cooler inlet line 11a comprises a radiator 37. Furthermore, only two control valves 27, 30 are used. During regular operation of the WHR system, the sub-cooler 19 receives air with a lower temperature than the condenser due to the existence of the radiator 37. The control unit 10 controls the supply of coolant to the sub-cooler 19 by means of the sub-cooler valve 26. The control valves 27, 30 are in open positions.

During a shutdown phase of the WHR system, the control unit 10 sets the first control valve 27 in a closed position such that the fluid connection between the condenser 17 and the expansion tank 20 is closed. The second control valve 30 is maintained in an open position. This means that the working fluid pump 13 sucks working fluid from the expansion tank 20 and the sub-cooler 19. The working fluid pump 13 provides a pressurized working fluid flow to the evaporator 14, the expander 15 and the condenser 17. Since the first control valve 27 is closed, it blocks the working fluid flow. This results in the creation of a high pressure area in the WHR system which includes the evaporator 14, the expander 15 and the condenser 17.

The control unit 10 receives information from the pressure and temperature sensor pt about the pressure and the temperature in the warmest point of the WHR system. The working fluid pump 13 runs until the control unit 10 receives information from said sensor pt indicating that the working fluid pressure is higher than the condensation pressure at the existing working fluid temperature. This means that all working liquid in the high pressure area of the WHR system is in liquid state. The control unit 10 closes the second control valve 30 such that the expansion tank 20 and the sub-cooler 19 is isolated from the high pressure area of the WHR system. The control unit 10 stops the working fluid pump 13. This means that liquid working fluid fills up the working fluid pump 13, the pump inlet line 12 an the sub-cooler 19. Thus, all components in the WHR system contains liquid working fluid except the isolated expansion tank 20 in the low pressure area of the WHR system.

During a following period when the WHR system is not in operation, the working fluid is cooled down by ambient air. Since the working fluid already is in liquid state in the high pressure area of the WHR system, no condensation of the working fluid is provided and no negative pressure are arisen in the high pressure area when the working fluid is cooled down to ambient air temperature. In view of the fact that there is no problem to provide a completely air tight sealing of the expansion tank 20, there will be no inleakage of air into the WHR system via the expansion tank 20 in spite of the fact that negative pressures are arisen in the expansion tank 20.

Figure 4:
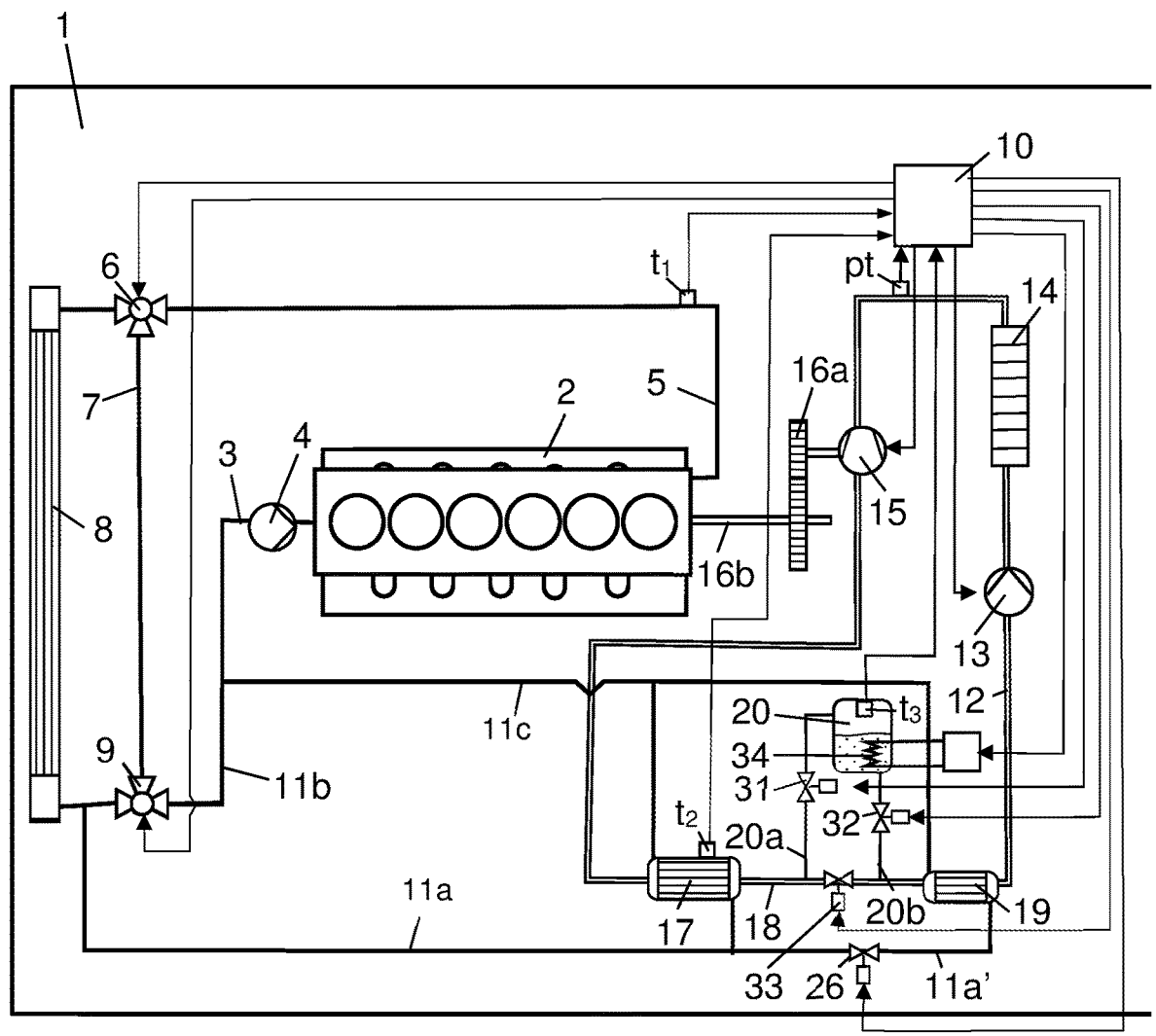
FIG. 4 shows an arrangement comprising a WHR system according to a fourth embodiment of the invention.

FIG. 4 shows a further embodiment of the arrangement. In this case, the expansion tank 20 is connected to a condenser outlet line 18 via a tank inlet line 20a and a tank outlet line 20b. The tank inlet line 20a comprises a first control valve 31 and the tank outlet line 20b comprises a second control valve 32. A third control valve 33 is arranged in the condenser outlet line 18 in a position between the tank inlet line 20a and the tank outlet line 20b. Furthermore, a heater 34 is arranged in the expansion tank 20. The heater 34 is controlled by the control unit 10. A third temperature sensor $t_3$ is arranged in the expansion tank 20 sensing the temperature of the working fluid in the expansion tank 20.

During regular operation of the WHR system, the control unit 10 sets the first control valve 31 and the second control valve 32 in open positions, and the third control valve 33 in a closed position. This means that all working fluid leaving the condenser 17 is received in the expansion tank 20. The working fluid is directed from the expansion tank 20, via the tank outlet line 20b, to the sub-cooler 19. The cooling of the working fluid in the condenser 17 and the subcooling of the working fluid in the sub-cooler 19 is performed in a corresponding manner as the embodiments shown in FIGS. 1 and 2.

During a shutdown phase of the WHR system, the control unit 10 sets the expander 15 in an idle state and slows down the speed of the working fluid pump 15 such that it circulates working fluid through the WHR system with a low capacity. The control unit 10 sets the first control valve 31 in a closed position, the second control valve 32 in an open position and the third control valve 33 in an open position. In this case, the working fluid flows from the condenser 17, via the condenser outlet line 18, to the sub-cooler 19. The control unit 10 controls the heater 34 such that the temperature of the working fluid does not drops to a lower temperature than the condensation temperature of the working fluid at ambient air pressure. In case the working fluid is ethanol, the heater 34 makes sure that the working fluid temperature does not drop below 78° C. in the expansion tank 20. This means that the expansion tank 20 contains gaseous working fluid and liquid working fluid. The circulating working fluid in the WHR system is cold down by ambient air. This results in that gaseous working fluid is condensed. Liquid working fluid is supplied from the expansion tank 20 to the condenser outlet line 18 in order to compensate for this volume change of the circulating working fluid in the WHR system. This means that the pressure in the WHR system do not drop below the pressure in the expansion tank 20 which corresponds to ambient air pressure. The control unit 10 receives information from, for example, the second temperature sensor $t_2$ about the temperature of the working fluid circulating in the WHR system. When the control unit 10 receives information from the second temperature sensor $t_2$ indicating that the circulating working fluid has a lower temperature than its condensation temperature at ambient air pressure, all circulating working fluid is in liquid state. The control unit 10 sets the second control valve 32 in a closed position such that the expansion tank 20 is isolated from other parts of the WHR system. Since the working fluid already is in liquid state in all parts of the WHR system except in the isolated expansion tank 20, further cooling to ambient air temperature will not results in creation of negative pressures said parts of the WHR system which are sensible for inleakage of air.

Figure 5:
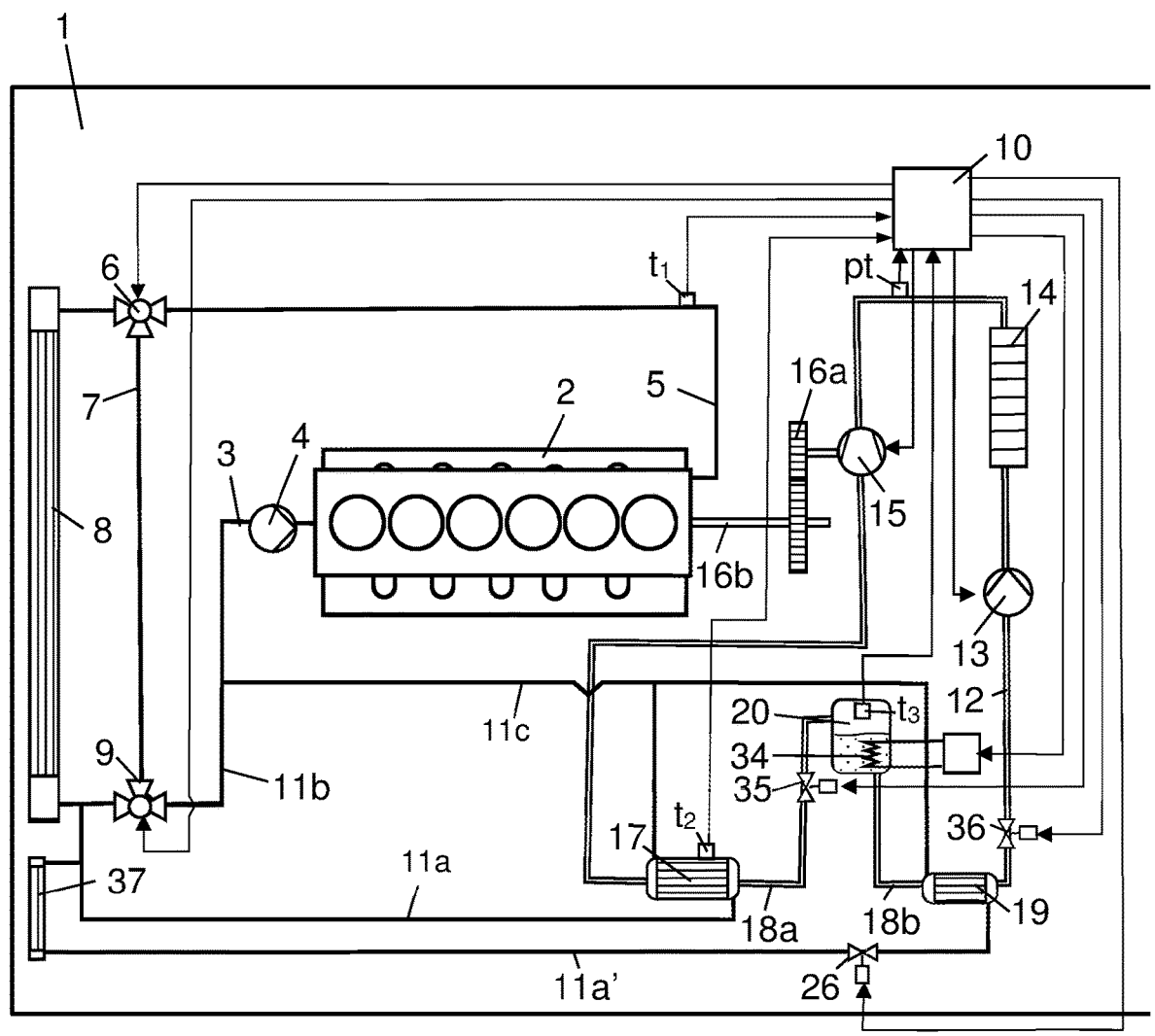
FIG. 5 shows an arrangement comprising a WHR system according to a fifth embodiment of the invention.

FIG. 5 shows a somewhat simpler embodiment than the embodiment shown in FIG. 4. In this case, the sub-cooler inlet line 11a comprises a radiator 37. Furthermore, only two control valves 35, 36 are used. A first control valve 35 is arranged in the condenser outlet line 18a and second control valve 36 arranged in the pump inlet line 12. Alternatively, the second control valve 36 may be arranged in the sub-cooler inlet line 18b. During regular operation of the WHR system, the sub-cooler 19 receives air with a lower temperature than the condenser due to the existence of the radiator 37. The control unit 10 controls the supply of coolant to the sub-cooler 19 by means of the sub-cooler valve 26. The control valves 35, 36 are in open positions.

During a shutdown phase of the WHR system, the control unit 10 sets the expander 15 in an idle state and slows down the speed of the working fluid pump 13 such that it circulates working fluid through the WHR system with a low capacity. The control unit 10 controls the heater 34 such that the temperature of the working fluid does not drops to a lower temperature than the condensation temperature of the working fluid at ambient air pressure. This means that the expansion tank 20 contains gaseous working fluid and liquid working fluid. The circulating working fluid in the WHR system is cold down by ambient air. This results in that circulating gaseous working fluid is condensed. Liquid working fluid is supplied from the expansion tank 20 to the condenser outlet line 18 in order to compensate for the volume change that occurs when gaseous working fluid condensates. This means that the pressure in the WHR system do not drop below the pressure in the expansion tank 20 which corresponds to ambient air pressure. The control unit 10 receives information from, for example, the second temperature sensor $t_2$ about the temperature of the working fluid circulating in the WHR system. When the control unit 10 receives information from the second temperature sensor $t_2$ indicating that the circulating working fluid has a lower temperature than its condensation temperature at ambient air pressure, all circulating working fluid is in liquid state. The control unit 10 sets the control valves 35, 36 in closed positions such that the expansion tank 20 is isolated from the other parts of the WHR system. Since the working fluid already is in liquid state in all parts of the WHR system except in the isolated expansion tank 20, further cooling to ambient air temperature will not results in creation of negative pressures in said parts of the WHR system which are sensible for inleakage of air.

The invention is not restricted to the described embodiment but may be varied freely within the scope of the claims. It is, for example, possible to cool the working fluid in the condenser and the sub-cooler by cooling means having another design than the cooling system shown in FIGS. 1-5.

The invention claimed is:

1. An arrangement comprising a waste heat recovery system (WHR-system), wherein the WHR-system comprises:

a working fluid pump;
an evaporator;
an expander;
a condenser;
an expansion tank having a constant inner volume configured to accommodate working fluid;
first cooling means configured to cool a working fluid in the condenser;
an electronic control unit configured to control the first cooling means such that the working fluid is cooled to a desired condensation temperature in the condenser during operation of the WHR system;
a sub-cooler arranged in a position downstream of the condenser; and
second cooling means configured to cool the working fluid in the sub-cooler,
wherein the electronic control unit controls the second cooling means such that the working fluid receives a determined subcooling in the sub-cooler during operation of the WHR system.

2. An arrangement according to claim 1, wherein the first cooling means comprises a condenser inlet line and a condenser valve configured to direct coolant from a cooling system to the condenser, and wherein the electronic control unit controls the condenser valve, such that coolant at a temperature and flow is directed, via the condenser inlet line, to the condenser at which the working fluid is cooled to the desired condensation temperature.

3. An arrangement according to claim 1, wherein the second cooling means comprises a sub-cooler inlet line and a sub-cooler valve configured to direct coolant from a cooling system to the sub-cooler, and wherein the electronic control unit controls the sub-cooler valve, such that coolant at a temperature and flow is directed, via the sub-cooler inlet line, to the sub-cooler at which the working fluid receives the determined subcooling.

4. An arrangement according to claim 2, wherein the second cooling means comprises a sub-cooler valve configured to direct a part of the coolant flow in the condenser inlet line, via the sub-cooler inlet line, to the sub-cooler.

5. An arrangement according to claim 3, wherein the sub-cooler inlet line comprises a cooler.

6. An arrangement according to claim 1, wherein the expansion tank is connected to a flow passage directing working fluid from the condenser to the sub-cooler.

7. An arrangement according to claim 6, wherein the expansion tank is connected to said flow passage via a single line.

8. An arrangement according to claim 6, wherein the expansion tank is connected to said flow passage via a tank inlet line and a tank outlet line.

9. An arrangement according to claim 6, wherein said flow passage extends through the expansion tank.

10. An arrangement according to claim 1, wherein the arrangement comprises flow restricting means, which, during a shutdown phase of the WHR system, is configured restrict the working fluid flow in the WHR system such that the working fluid pump creates a low pressure area in the WHR system including the expansion tank, and a high pressure area in the WHR system including the evaporator, the expander and the condenser, wherein the electronic control unit control the working fluid pump to run until all working fluid in the high pressure area is in liquid state.

11. An arrangement according to claim 10, wherein said high pressure area also comprises the sub-cooler.

12. An arrangement according to claim 1, wherein the arrangement comprises a heater arranged in the expansion tank and tank flow restricting means and that the electronic control unit, during a shutdown phase of the WHR system, controls the heater such that it establishes a higher temperature of the working fluid in the expansion tank than the condensation temperature of the working fluid at ambient pressure, and to isolate the expansion tank from the remaining part of the WHR system when the temperature of the working fluid in the remaining part of the WHR system is lower than the condensation temperature of the working fluid at ambient pressure.

13. An electronically implemented method for controlling a WHR-system, which comprises a working fluid pump, an evaporator, an expander, a condenser, an expansion tank having a constant inner volume configured to accommodate working fluid, wherein the method comprises, via operation of an electronic control unit:

cooling of the working fluid in the condenser to a desired condensation temperature by controlling a first cooling means during a regular operation phase of the WHR system; and cooling the working fluid in a sub-cooler, which is arranged downstream of the condenser, such that the working fluid receives a desired subcooling in the sub-cooler by controlling a second cooling means during the regular operation phase of the WHR system.

14. An electronically implemented method according to claim 13 further comprising, via operation of the electronic control unit:

during a shutdown phase of the WHR system, restricting flow of the working fluid in the WHR system, such that the working fluid pump creates a low pressure area in the WHR system including the expansion tank and a high pressure area including the evaporator, the expander and the condenser; and running the working fluid pump until all working fluid in the high pressure area is in liquid state.

15. An electronically implemented method according to claim 13 further comprising, via operation of the electronic control unit:

during a shutdown phase of the WHR system, controlling a heater to heat the working fluid in the expansion tank to a higher temperature than the condensation temperature of the working fluid at ambient pressure; and isolating the expansion tank from the other parts of the WHR system when the temperature of the working fluid in the other part of the WHR system is lower than the condensation temperature of the working fluid at ambient pressure.

* * * * *